United States Patent
Griffin

(10) Patent No.: US 11,150,047 B2
(45) Date of Patent: Oct. 19, 2021

(54) FIREARM INCORPORATING RECOIL REDUCTION

(71) Applicant: The Boeing Company, Chicago, IL (US)

(72) Inventor: Steven Griffin, Kihei, HI (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/522,595

(22) Filed: Jul. 25, 2019

(65) Prior Publication Data

US 2021/0025669 A1    Jan. 28, 2021

(51) Int. Cl.
*F41C 23/06* (2006.01)
*F16F 7/104* (2006.01)
*F16F 7/10* (2006.01)

(52) U.S. Cl.
CPC .............. *F41C 23/06* (2013.01); *F16F 7/104* (2013.01); *F16F 7/1011* (2013.01); *F16F 2222/08* (2013.01); *F16F 2230/18* (2013.01)

(58) Field of Classification Search
None
See application file for complete search history.

(56) References Cited

U.S. PATENT DOCUMENTS

| | | | |
|---|---|---|---|
| 2,818,783 A * | 1/1958 | Carlson | F41A 25/00 89/42.01 |
| 4,910,904 A * | 3/1990 | Rose | F41C 23/06 42/73 |
| 5,572,900 A | 11/1996 | Ayeni | |
| 5,953,952 A | 9/1999 | Strickland | |
| 6,088,897 A | 7/2000 | Banks et al. | |
| 6,134,940 A | 10/2000 | Banks et al. | |
| 6,363,768 B1 | 4/2002 | Earls et al. | |
| 6,386,028 B2 | 5/2002 | Kolbe | |
| 7,669,356 B2 | 3/2010 | Joannes et al. | |

(Continued)

FOREIGN PATENT DOCUMENTS

CN    203217500 U    9/2013
CN    104415524 A    3/2015
(Continued)

OTHER PUBLICATIONS

McDowell et al., Laboratory and Workplace Assessments of Rivet Bucking Bar Vibration Emissions, Ann. Occup. Hyg., vol. 59, No. 3, 382-397, Nov. 7, 2014, 16 pages.

(Continued)

*Primary Examiner* — Troy Chambers
*Assistant Examiner* — Benjamin S Gomberg
(74) *Attorney, Agent, or Firm* — Kolisch Hartwell, P.C.

(57) ABSTRACT

Recoil-reducing firearm including a compensating inertial mass coupled to the firearm by a flexible and resilient mass support, where the mass support permits translation of the compensating inertial mass along a translation axis but substantially prevents movement of the compensating inertial mass in a direction orthogonal to the translation axis. The mass support is configured so that movement of the compensating inertial mass in a distal direction can at least partially dissipate energy imparted to the firearm by firing a round of ammunition and impelling the projectile down the barrel.

21 Claims, 5 Drawing Sheets

(56) References Cited

U.S. PATENT DOCUMENTS

| | | |
|---|---|---|
| 8,176,667 B2 | 5/2012 | Kamal et al. |
| 8,353,121 B2 | 1/2013 | Clark et al. |
| 8,418,391 B2 | 4/2013 | Kemmerer et al. |
| 8,468,868 B1 | 6/2013 | Garrett, Jr. |
| 8,668,496 B2 | 3/2014 | Nolen |
| 8,733,006 B2 | 5/2014 | Williams et al. |
| 8,887,430 B2 | 11/2014 | Wichner |
| 9,126,094 B1 | 9/2015 | Davis |
| 9,151,564 B1 | 10/2015 | Baxter |
| 9,180,365 B2 | 11/2015 | Torre et al. |
| 9,259,779 B2 | 2/2016 | Sarh et al. |
| 9,440,284 B2 | 9/2016 | Sarh et al. |
| 10,041,764 B2 | 8/2018 | Ooi |
| 10,071,415 B1 | 9/2018 | Trenary |
| 10,088,266 B1 * | 10/2018 | Fournerat ............... F41C 23/06 |
| 2001/0015090 A1 | 8/2001 | Kolbe |
| 2005/0188583 A1 | 9/2005 | Jackson et al. |
| 2009/0253103 A1 | 10/2009 | Hogan, Jr. |
| 2009/0277065 A1 | 11/2009 | Clark et al. |
| 2009/0298590 A1 | 12/2009 | Marks et al. |
| 2011/0126622 A1 | 6/2011 | Turner |
| 2011/0162245 A1 | 7/2011 | Kamal et al. |
| 2011/0207089 A1 | 8/2011 | Lagettie et al. |
| 2011/0252684 A1 | 10/2011 | Ufer et al. |
| 2012/0015332 A1 | 1/2012 | Stutz |
| 2012/0297654 A1 | 11/2012 | Williams et al. |
| 2013/0019510 A1 | 1/2013 | Kemmerer et al. |
| 2013/0019512 A1 | 1/2013 | Kemmerer et al. |
| 2013/0125441 A1 | 5/2013 | Westwood et al. |
| 2013/0225288 A1 | 8/2013 | Levin et al. |
| 2014/0028635 A1 | 1/2014 | Krah |
| 2014/0190051 A1 | 7/2014 | Wichner |
| 2014/0366419 A1 | 12/2014 | Allan |
| 2015/0253109 A1 | 9/2015 | Wichner |
| 2015/0369554 A1 | 12/2015 | Kramer |
| 2016/0169627 A1 | 6/2016 | Northrup et al. |
| 2017/0074618 A1 | 3/2017 | Wichner |

FOREIGN PATENT DOCUMENTS

| | | | |
|---|---|---|---|
| DE | 19621700 A1 * | 12/1997 | ............ F16F 7/1011 |
| WO | 2008025973 A2 | 3/2008 | |
| WO | 2014145079 A1 | 9/2014 | |
| WO | 2016115554 A1 | 7/2016 | |

OTHER PUBLICATIONS

Yocto—3D—USB Acceleration, tilt and orientation sensor, retrieved from the internet on Jul. 25, 2019, from http://www.yoctopuce.com/EN/products/usb-position-sensors/yocto-3d, 4 pages.

* cited by examiner

FIREARM INCORPORATING RECOIL REDUCTION

FIELD

This disclosure relates to recoil reduction in firearms, and more specifically, the disclosed embodiments relate to recoil-reducing firearms that reduce recoil stresses on firearm users.

CROSS-REFERENCE TO RELATED APPLICATIONS

U.S. patent application Ser. No. 16/218,359 for IMPACT-COMPENSATING BUCKING BAR, filed Dec. 12, 2018 and published as U.S. Patent Publication No. 2020/0188986 on Jun. 18, 2020, is hereby incorporated by reference for any and all purposes.

INTRODUCTION

Firearm users, whether sportsmen or competitive shooters, can fire hundreds of rounds during training, in the field, and in competition. Skeet shooting, for example, can require up to 25 shots per round, with multiple rounds experienced in a given day.

Unfortunately, frequent and repeated exposure to firearm recoil has been associated with a variety of health hazards, including bruising at the shoulder or hand, pain with motion post-firing, soft tissue injuries, facial lacerations, stress fractures, and other related trauma. Long term exposure to recoil impact can lead to persistent pain and chronic inflammation, which can even alter the natural mechanics of the affected limb, and negatively impact joints and accelerate joint degeneration.

Perhaps more troubling are indications that the repeated mild sub-concussive head impacts associated with persistent exposure to gunshot recoil can lead to at least some degree of traumatic brain injury (TBI), as indicated by abnormalities in cellular metabolism, membrane fluidity, neuro-inflammation, synaptic function, tearing of axons, and structural integrity of the brain itself.

One way to reduce the risk of firearm or other activity-related hand and upper extremity injuries is to limit practice sessions in order to provide adequate time for rest and recovery. Strengthening exercises can also help protect soft tissue and bone of the impacted joints. Unfortunately both of these proactive measures may be ignored by an enthusiastic gun owner.

There is, therefore, a need for improved recoil-reducing firearms and methods of reducing firearm recoil on firearm users.

SUMMARY

The present disclosure provides recoil-reducing firearms, and methods of reducing firearm recoil on firearm users.

In some embodiments, the disclosure provides a recoil-reducing firearm that includes a barrel having a longitudinal barrel axis; an action, that includes a trigger, that is configured to load and fire a round of ammunition in order to impel a projectile down the barrel; and a compensating inertial mass coupled to the firearm by a flexible and resilient mass support. The mass support is configured to permit translation of the compensating inertial mass along a translation axis, but substantially prevents movement of the compensating inertial mass in a direction orthogonal to the translation axis. The movement of the compensating inertial mass in the distal direction at least partially dissipates energy imparted to the firearm upon firing a round of ammunition and impelling the projectile down the barrel.

In some embodiments, the disclosure provides a recoil-reducing firearm that includes a barrel, having a longitudinal barrel axis; an action, that includes a trigger, that is configured to load and fire a round of ammunition in order to impel a projectile down the barrel; and a compensating inertial mass coupled to the firearm by a flexible and resilient mass support. The mass support is configured to permit translation of the compensating inertial mass along a translation axis but prevents movement of the compensating inertial mass in a direction orthogonal to the translation axis. The firearm further includes a mass actuator that is coupled to the firearm and is configured to act upon the compensating inertial mass so as to urge the firearm in a distal direction upon activation of the mass actuator. The firearm further includes a firing detector that is configured to transmit an activation signal to a processor that is coupled to the firing detector upon detecting a firing of the firearm; and the processor is configured to activate the mass actuator upon receiving the activation signal from the firing detector. The resulting movement of the firearm in the distal direction upon activation of the mass actuator is capable of at least partially dissipating the recoil imparted to the firearm by impelling a projectile down the barrel.

In some embodiments, the disclosure provides a recoil-reducing firearm that includes a barrel, having a longitudinal barrel axis, an action that is configured to load and fire a round of ammunition to impel a projectile down the barrel, a magnetic body rigidly coupled to a first portion of the firearm, and a mass actuator rigidly coupled to a second portion of the firearm. The first portion and the second portion of the firearm are coupled to one another by a flexible and resilient mass support, and the mass actuator is configured to act upon the magnetic body so as to urge the first and second portions of the firearm apart along a translation axis that is substantially parallel to the barrel axis, thereby at least partially dissipating a recoil imparted to the firearm by impelling the projectile down the barrel.

In some embodiments, the disclosure provides a method of reducing firearm recoil forces on a firearm user, the method including detecting, by a firing detector coupled to a firearm, a firing of the firearm; transmitting, by a communication interface, an activation signal from the firing detector to a processor coupled to the firing detector; and activating, by the processor, a mass actuator that is coupled to the firearm and configured to act upon a compensating inertial mass so that the firearm is urged in a distal direction in reaction to at least partially dissipate recoil forces imparted to the firearm by the firing.

The disclosed features, functions, and advantages of the disclosed firearms and methods may be achieved independently in various embodiments of the present disclosure, or may be combined in yet other embodiments, further details of which can be seen with reference to the following description and drawings.

DESCRIPTION

Figure 1:
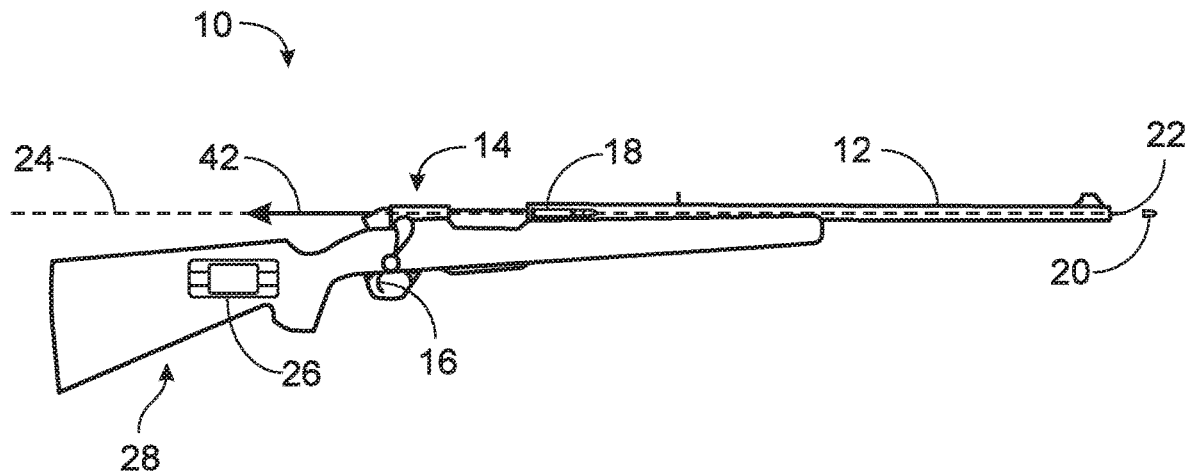
FIG. 1 semi-schematically depicts a recoil-reducing firearm according to an illustrative aspect of the present disclosure.

Various aspects and examples of recoil-reducing firearms and methods for their use are described below and illustrated in the associated drawings. Unless otherwise specified, the disclosed apparatus and/or their various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments will necessarily provide the same advantages or the same degree of advantages.

A firearm, as used herein, refers to a weapon capable of firing a projectile using an explosive charge as propellant. Firearms are typically considered to be portable weapons, such as can be carried and fired by an individual, and include rifles (or long guns) and handguns such as pistols and revolvers.

Firearms typically include an action that is coupled to a barrel, and supported by a stock or grip. The action of a firearm includes at least the moving parts responsible for acting upon the ammunition, including loading the ammunition, firing the ammunition, and ejecting the spent shells or cartridges after firing.

The barrel of a firearm is a straight shooting tube, coupled to the action, along which a projectile is propelled by a rapid expansion of high-pressure gas created by a chemical explosion resulting when a round of ammunition is fired.

The stock or grip of a firearm is that portion of the firearm to which the action and barrel are attached, and by which the user can grasp and aim the firearm. Where the firearm is a handgun, the firearm typically includes a grip that is held by the user's hand to orient the handgun in the desired forward and vertical orientation, and that is configured so that when the user grasps the grip, the user's hand is positioned appropriately to operate a trigger of the handgun.

Where the firearm is a long gun, such as a rifle or shotgun, the firearm typically includes a stock, or gunstock. A stock typically permits the firearm user to firmly brace the firearm against the user's shoulder to stabilize the firearm, and to more easily aim at the target. The stock typically also help to transfer recoil energy from the firearm to the user's shoulder, helping to minimize muzzle rise after firing.

When the terms "front", "back", "top", and "bottom" are used in the context of a firearm, such terms should be given their generally accepted meanings. That is, the muzzle of the firearm barrel is disposed at the "front" of the firearm, and the stock or grip is disposed at the "back" of the firearm, while the "top" and "bottom" of the firearm are consistent with the orientation of the firearm as it is conventionally held and/or aimed by a firearm user.

The illustrations of FIGS. 1-6 are semi-schematic in nature, and so do not necessarily accurately reflect the relative sizes and arrangement of components of the firearms of the present disclosure.

Figure 2:
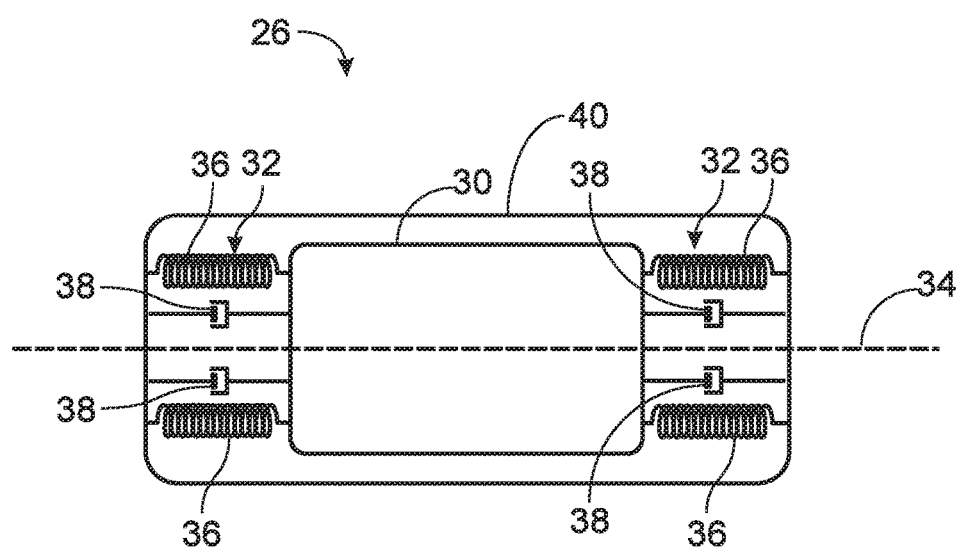
FIG. 2 semi-schematically depicts a recoil-reducing apparatus according to an illustrative aspect of the present disclosure.

FIGS. 1 and 2 depict a recoil-reducing firearm 10 according to an aspect of the present disclosure. Firearm 10 includes a barrel 12, and an action 14 coupled to barrel 12. Action 14 typically includes a trigger 16, and is configured to load and fire a round 18 of ammunition in order to impel a projectile 20 down barrel 12 and out a muzzle 22 of the barrel. Barrel 12 typically defines a longitudinal barrel axis 24, and projectile 20 is typically impelled substantially along barrel axis 24 when firearm 10 is fired. Firearm 10 further includes a recoil-reducing apparatus 26 associated with, coupled to, or disposed within a stock or grip 28. Although firearm 10 of FIG. 1 is depicted as a rifle, the principles and philosophy of the present disclosure can be applied to, and embodied by, handguns equally as well.

As shown in greater detail in FIG. 2, recoil-reducing apparatus 26 includes a compensating inertial mass 30 that is coupled to firearm 10 by a flexible and resilient mass support 32, where mass support 32 is configured to permit a translation of compensating inertial mass 30 along a translation axis 34 but prevent or substantially prevent movement of compensating inertial mass 30 in a direction substantially orthogonal to translation axis 34. In an example, substantially preventing movement of compensating inertial mass 30 in a direction substantially orthogonal to translation axis 34 can include preventing any movement of compensating inertial mass 30 in a direction substantially orthogonal to translation axis greater than 0.02 inches (0.5 mm).

Mass support 32 and compensating inertial mass 30, in combination with the other components of firearm 10, are configured so that a movement of compensating inertial mass 30 in a distal direction at least partially dissipates recoil energy that is imparted to firearm 10 by impelling projectile 20 down barrel 12. In order to enhance the ability of recoil-reducing apparatus 26 to reduce recoil forces, recoil-reducing apparatus 26 is typically oriented so that translation axis 34 is parallel or at least approximately parallel to barrel axis 24, which is in turn coincident with the vector along which recoil force 42 is applied to firearm 10. In an example, the translation axis 34 can be considered parallel or at least approximately parallel to barrel axis 24 when translation axis 34 is disposed within about 10 degrees of barrel axis 24, more preferably within about 5 degrees of barrel axis 24.

Compensating inertial mass 30 typically is configured to have a size and composition that enhances the moment of inertia of the inertial mass, in order to maximize the ability of inertial mass 30 to compensate for recoil energy transferred to firearm 10. For example, inertial mass 30 can be composed of a relatively dense material, such as a heavy metal. For example, inertial mass 30 can include one or more heavy metals such as lead or lead alloys, tungsten and tungsten alloys, osmium and osmium alloys, uranium and uranium alloys, molybdenum and molybdenum alloys, iron and iron alloys, nickel and nickel alloys, copper and copper alloys, and zinc and zinc alloys, among others. While the particular size and shape of inertial mass 30 may vary according to the particular design of firearm 10, and how recoil-reducing apparatus 26 couples to the firearm, inertial mass 30 should not be made so large and so heavy that a user of firearm 10 will have difficulty supporting and stabilizing firearm 10 during use. For example, inertial mass 30 can have a mass of 500 g to 3 kg, more typically 1 kg to 2.5 kg, and in particular 1.5 kg to 2.0 kg.

Compensating inertial mass 30 can be coupled to firearm 10 by a flexible and resilient mass support 32. For the exemplary firearm of FIG. 1, recoil-reducing apparatus 26 is coupled to or disposed within stock or grip 28, such that inertial mass 30 is coupled to stock or grip 28 by the mass support 32. Mass support 32 can be configured to permit translation of the compensating inertial mass 30 along or parallel to barrel axis 24, and simultaneously substantially prevents movement of compensating inertial mass 30 in any direction orthogonal to barrel axis 24. Mass support 32 can be additionally configured to provide a damping effect on the translational motion of inertial mass 30 along mass translation axis 34. That is, mass support 32 can incorporate one or more mechanisms for reducing and/or restricting the translational oscillations of inertial mass 30, typically by dissipating the energy of the oscillation by resisting the translational motion to as least some extent. Mass support 32 can be configured to provide sufficient resilience to translational motion that inertial mass 30 is returned to its initial position after such motion.

Figure 3:
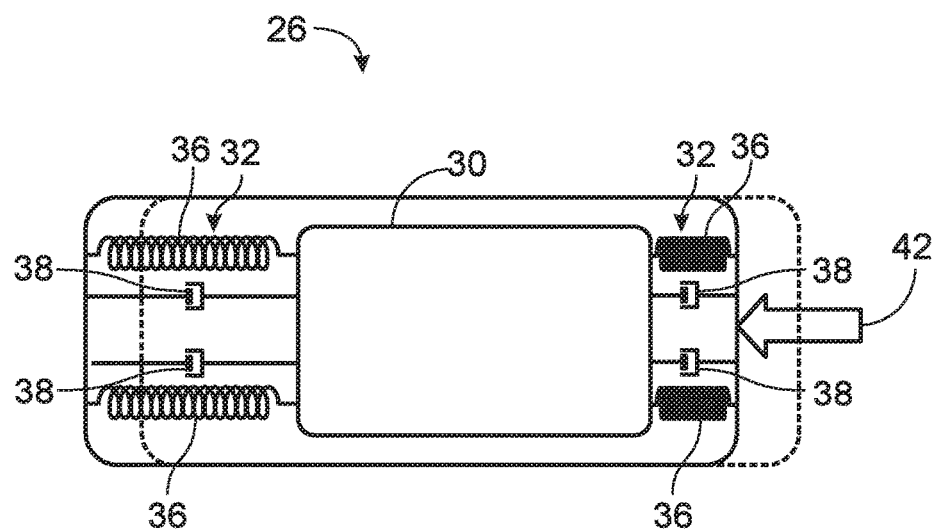
FIG. 3 semi-schematically depicts the recoil-reducing apparatus of FIG. 2 as it compensates for an applied recoil force.

Mass support 32 can include one or more spring elements that are configured to provide a resistance to translation of the compensating inertial mass 30 along translation axis 34 (or approximately parallel to barrel axis 24). Alternatively, or in addition, mass support 32 can include one or more damping mechanisms, or dampers. For instance, as shown in FIG. 2, mass support 32 can include one or more spring elements 36 that are configured to provide a resistance to translation of the compensating inertial mass 30 along translation axis 34 (or approximately parallel to barrel axis 24). Further, as shown in FIG. 2, mass support 32 can include one or more damping mechanisms, or dampers 38. Where recoil-reducing apparatus 26 includes dampers 38 in addition to spring elements 36, dampers 38 can be disposed in parallel with spring elements 36, as shown in FIGS. 2 and 3.

Spring elements 36 can include mechanical springs, such as coiled springs, leaf springs, and the like. However, as an alternative or addition to mechanical springs, spring elements 36 of mass support 32 can include alternative resilient compressive supports and/or resilient elastic supports. Alternatively or in addition, mass support 32 can include pneumatic or hydraulic resistance media, such as fluids that resist a motion of inertial mass 30 when it is suspended in the fluid, or that must pass through restricted passages in inertial mass 30 as it translates. Mass support 32 may be configured to completely support inertial mass 30, or inertial mass 30 may be, for example, slidably supported by one or more guide rods that are disposed along or parallel to mass translation axis 34, where the guide rod(s) serves to keep inertial mass 30 centered and to prevent motion orthogonal to translation axis 34. In one aspect of the present disclosure, mass support 32 is configured to permit translation of compensating inertial mass 30 substantially along translation axis 34 which is approximately parallel to barrel axis 24.

Mass support 32 couples inertial mass 30 to firearm 10. Typically, firearm 10 includes or incorporates a stock or grip 28 that is coupled to action 14 and barrel 12 of firearm 10, and compensating inertial mass 30, and resilient mass support 32 are coupled to stock or grip 28. In one aspect, recoil-reducing apparatus 26 is enclosed within or coupled directly to stock or grip 28. Alternatively, recoil-reducing apparatus 26 can be coupled to another portion of firearm 10, for example mounted below and in alignment with barrel 12. Care should be taken, however, that placing the additional weight of recoil-reducing apparatus 26 at a position forward of the center of mass of firearm 10 not compromise the resulting ability to handle and aim the firearm.

When recoil-reducing apparatus 26 is disposed within a firearm stock or grip, the various components of recoil-reducing apparatus 26 can be enclosed by the stock or grip itself. Alternatively, the components of recoil-reducing apparatus 26 can be enclosed by a housing 40, where housing 40 is typically configured to be both light and strong. Suitable materials for housing 40 should be both lightweight and rigid, so that they are efficient at transferring impulse forces but contribute relatively little to the mass, and therefore to the moment of inertia, of the combined recoil-reducing apparatus 26 and firearm 10.

During use of firearm 10, action 14 can be used to advance a round 18 of ammunition into the firing chamber of firearm 10. Trigger 16 of action 14 can then be actuated to initiate a firing sequence of the firearm, which impels a projectile 20 down barrel 12 along barrel axis 24. The explosive force that resulted in projectile 20 being accelerated down barrel 12 similarly generates a recoil force 42 of equal magnitude but opposite direction, which is then transmitted to the user of firearm 10 via stock or grip 28 due to firearm 10 being impelled in the proximal direction (backwards).

As compensating inertial mass 30 is selected to have a relatively large mass, inertial mass 30 has a correspondingly large relative moment of inertia. As mass support 32 permits movement along translation axis 34, inertial mass 30 will not be displaced in the proximal direction to the same degree as the rest of firearm 10 by the recoil force 42 created by firing of the firearm. Therefore, with respect to the frame of reference of firearm 10, inertial mass 30 will move in a distal direction, as shown in FIG. 3. The resulting deformation of mass support 32 in response to the relative motion, where the proximal pair of spring elements is elongated, and the distal pair of spring elements is compressed, will at least partially dissipate the recoil energy imparted to firearm 10 by the discharge of the firearm.

Recoil-reducing apparatus 26 of FIGS. 2 and 3 therefore employs a passive reaction to recoil forces that at least partially absorbs the recoil generated by firearm 10. As the operation of recoil-reducing apparatus 26 is passive, it requires no additional electronics or power supply to provide this advantageous reduction in user exposure to recoil impacts.

Figure 4:
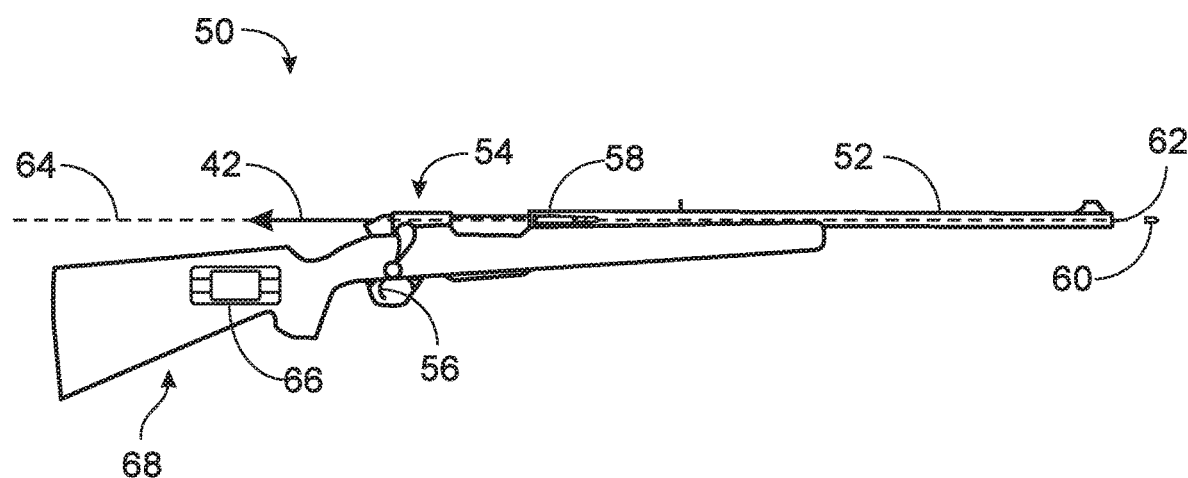
FIG. 4 semi-schematically depicts an alternative recoil-reducing firearm according to an illustrative aspect of the present disclosure.
Figure 5:
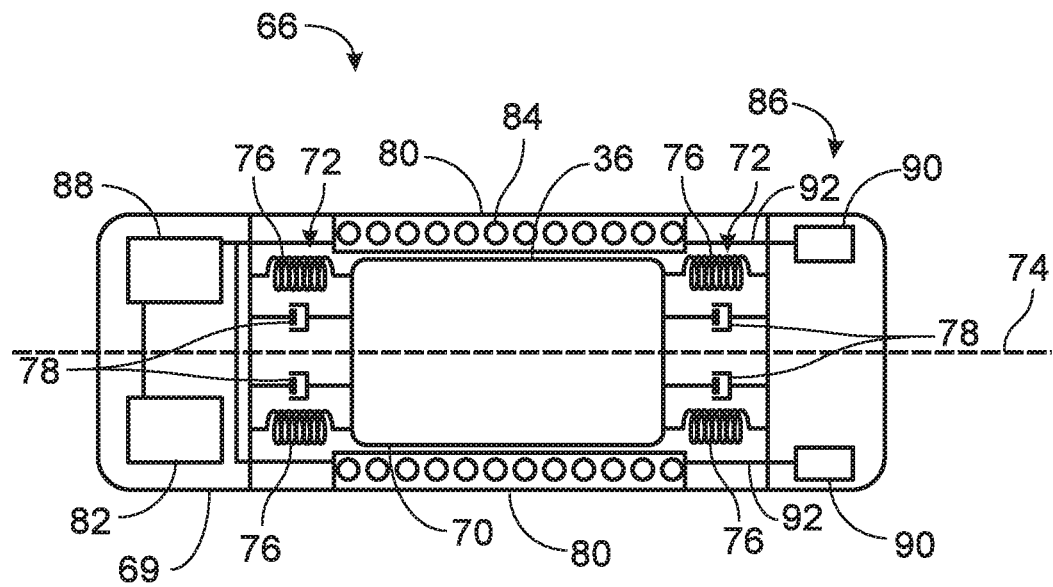
FIG. 5 semi-schematically depicts an alternative recoil-reducing apparatus according to an illustrative aspect of the present disclosure.
Figure 6:
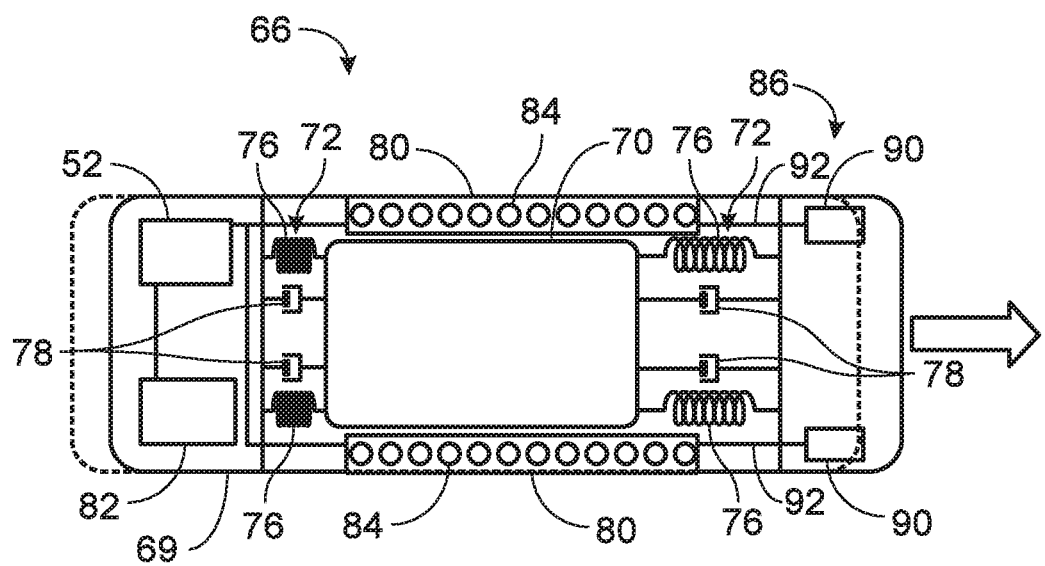
FIG. 6 semi-schematically depicts the recoil-reducing apparatus of FIG. 5 as it compensates for an applied recoil force.

In an alternative aspect, as shown in FIGS. 4-6, the recoil-reducing firearm can employ active recoil compensation to decrease recoil forces. Similarly to firearm 10, a firearm 50 includes a barrel 52, an action 54 including a trigger 56. During use of firearm 50, action 54 can be used to advance a round of ammunition 58 into the firing chamber of firearm 50. Trigger 56 of action 54 can then be actuated to initiate a firing sequence of the firearm, which impels a projectile 60 down barrel 52 along barrel axis 64. The explosive force that resulted in projectile 60 being accelerated down barrel 52 similarly generates a recoil force 42 of equal magnitude but opposite direction, which is then transmitted to the user of firearm 50 via stock or grip 68 due to firearm 50 being impelled in the proximal direction (backwards).

In order to compensate for the applied recoil forces, a recoil-reducing apparatus 66 is coupled to firearm 50, for example by being incorporated in stock or grip 68 and/or retained by a housing 69. A compensating inertial mass 70 of recoil-reducing apparatus 66 is similarly support by a flexible and resilient mass support 72 that can include one or more spring elements 76 and that permits translation of compensating inertial mass 70 relative to firearm 50 along a mass translation axis 74 at least approximately parallel to the barrel axis 64 of barrel 52, but that substantially prevents movement of compensating inertial mass 70 in a direction orthogonal to the mass translation axis 74. Mass support 72 is directly or indirectly coupled to firearm 50.

In order to facilitate an active compensation process, firearm 50 further includes a mass actuator 80 that is coupled to firearm 50, and is configured to act upon compensating inertial mass 70 by applying a force on inertial mass 70 so as to urge it along mass translation axis 74. Inertial mass 70 can be urged initially in either the proximal direction (backwards) or the distal direction (towards muzzle 62 of barrel 52). Typically, mass actuator 80 requires power input to act upon inertial mass 70, and so firearm 50 can include a power supply 82, which may include any suitable battery or, less preferably, a corded connection to an external power source. Recoil-reducing apparatus can also optionally include dampers 78 configured to help dampen the motion and/or oscillation of inertial mass 70.

Similar to that for recoil-reducing apparatus 26, the composition of inertial mass 70 of recoil-reducing apparatus 66 can be selected so that the mass and corresponding moment of inertia of inertial mass 70 urges the remaining components of firearm 50 in the proximal direction in reaction (as shown in FIG. 6) For example, inertial mass 70 can have a mass of 500 g to 3 kg, more typically 1 kg to 2.5 kg, and in particular 1.5 kg to 2.0 kg. However, unlike recoil-reducing apparatus 26, instead of passively absorbing a portion of the recoil forces, recoil-reducing apparatus 66 actively applies a counterforce along mass translation axis 74 in a direction opposed to the recoil force exerted on firearm 50 when fired.

Any configuration of mass actuator that is capable of urging inertial mass 70 in the proximal direction is a suitable mass actuator for the purposes of this disclosure. In one aspect, compensating inertial mass 70 of firearm 50 is composed of a ferromagnetic material, and firearm 50 further includes an electromagnetic mass actuator 80 that is configured to act upon ferromagnetic compensating inertial mass 70 by applying a force on inertial mass 70 so as to drive it in the proximal direction (backwards). Mass actuator 80 typically includes an electromagnetic coil 84 that surrounds ferromagnetic compensating inertial mass 70, so that passing a current through coil 84 of mass actuator 80 applies a force to inertial mass 70 in the proximal direction.

In order to more effectively counteract recoil forces, the movement of firearm 50 in opposition to the imposed recoil can be configured to occur within a relatively narrow time interval when the recoil force from firing a projectile is being imparted to the firearm. In order to activate the mass actuator with an appropriate timing, firearm 50 can further include a firing detector 86 that is configured to detect the firing of firearm 50. In one aspect, firearm 50 includes a processor 88 that is coupled to firing detector 86, such that firing detector 86 transmits an activation signal to processor 88 upon detecting the firing of firearm 50.

Processor 88 is additionally coupled to mass actuator 80, and is itself configured to activate mass actuator 80 upon receiving the activation signal from firing detector 86. The resulting movement of firearm 50 in the distal direction upon activation of mass actuator 80 is then capable of at least partially dissipating the recoil force imparted to firearm 50 by impelling a projectile down barrel 52.

Any method that permits processor 88 to effectively detect the firing of firearm 50, and to subsequently activate electromagnetic mass actuator 80, is a suitable method for the purposes of this disclosure.

In one aspect, firing detector 86 includes one or more sensors 90 coupled to processor 88, where sensors 90 are sufficiently sensitive to detect the firing of firearm 50. In an additional aspect, sensors 90 and processor 88 are additionally configured so that the force of the recoil imparted to firearm 50 is at least partially quantified, such that processor 88 can apply a current to coil 84 of mass actuator 80 that is substantially proportional to the force of the recoil imparted to firearm 50. As a result, firearm 50 can be urged in the distal direction with an amount of compensation force that is proportional to the force of the imparted recoil.

Any type of sensor that can accurately detect and/or quantify the recoil force applied to firearm 50 may be an appropriate sensor for use with firing detector 86. In one aspect, sensor 90 includes one or more microphones configured to detect the sound of firearm 50 firing. In an example, alternatively, or in addition to one or more microphones, sensor 90 includes one or more accelerometers configured to detection a motion of firearm 50 in response to firing. In yet another aspect, firing detector 86 can include one or more sensors 90 that are force transducers, where the force transducers are configured to detect the firing of firearm 50, and to send the activation signal to processor 88 upon detection of the firing. In this aspect, firing detector 86 can be configured to detect the recoil force of the firing and transmit the detected recoil force information to processor 88 with the activation signal, and processor 88 can be further configured to adjust the activation of mass actuator 80 to be at least substantially proportional to the detected force of the imparted recoil force.

As shown in FIGS. 5 and 6, sensor 90 can detect the firing of firearm 50, and firing detector 86 can transmit an activation signal to processor 88 via a communication link. The communication link can be a direct connection 92, such as via electrical or fiber optic connection. In one aspect, sensor 90 can be an action sensor that is configured to detect movement or actuation of action 54 of firearm 50, and to transmit an activation signal to processor 88 potentially simultaneous with, or even slightly prior to, the firing of the firearm. Where recoil-reducing apparatus 66 includes an action sensor, the action sensor can be configured to detect the movement and/or actuation of any component of action 54, but may be particularly advantageous if the action sensor is a trigger sensor 94 that can be used to detect movement or actuation of trigger 56.

Figure 7:
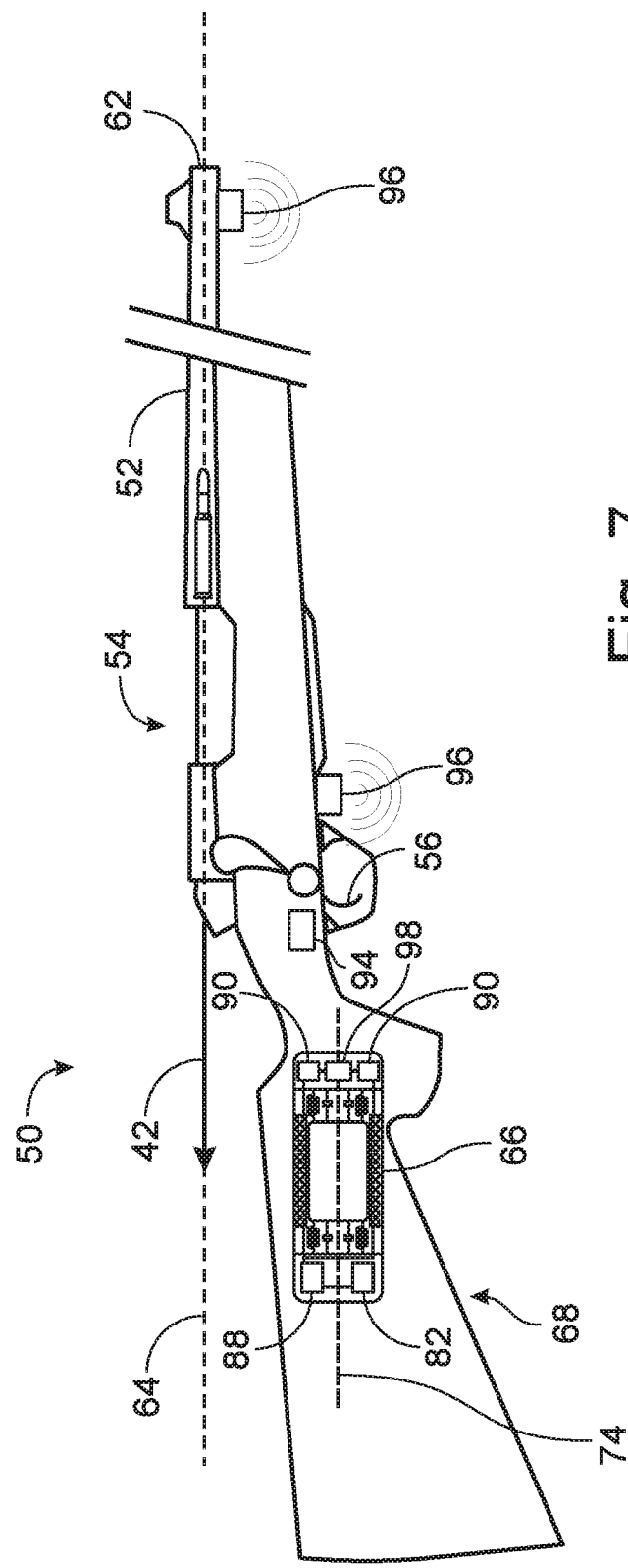
FIG. 7 semi-schematically depicts an alternative recoil-reducing firearm that employs wireless communication, according to an illustrative aspect of the present disclosure.

In an alternative aspect, as shown in FIG. 7, the activation signal can be transmitted from firing detector 86 to processor 88 via a communication link that is a wireless communication link. In this aspect, a remote sensor 96 can be disposed on or in another portion of firearm 50, such as action 54, or an even more remote portion such as proximate the muzzle 62. Remote sensor 96 can be configured to detect the firing of firearm 50 and to wirelessly transmit an activation signal to wireless receiver 98. For example, remote sensor 96 can be configured to function as a trigger sensor on firearm 50, so that remote sensor 96 can detect actuation of trigger 56 of firearm 50, and transmit a wireless signal to receiver 98 and thereby transmit the activation signal to processor 88.

By incorporating a wireless communication link, potential problems with signal latency may arise. That is, a delay may be created between detection of firearm 50 firing and activation of mass actuator 80 due to one or more of encoding, transmission, reception, and decoding of the wireless signal, among other factors. Models have shown, however, that when the activation of the mass actuator lags behind the impulse arising from firing by not more than 20 degrees of the phase of the frequency of the incoming recoil impulse, a significant amount of the recoil force will nonetheless be attenuated, up to approximately 60% attenuation.

In practical terms the wireless communication of the strike signal to the processor preferably exhibits no more than 0.1 msec latency. The ITU IMT-2020 wireless communication standard (5G) approaches this requirement, and the L2WIRELESS industrial control system exceeds it. In general, any wireless technology that creates minimal latency during operation of the disclosed firearms is an appropriate wireless technology.

As noted above, in order to effectively counteract the effect of the recoil on firearms 50 or 100, the activation of mass actuator 80 should be timed to substantially correspond to the time interval during which the incoming recoil energy is received. Where the recoil-reducing firearm exhibits an activation delay between processor 88 receiving an activation signal originating from a sensor 90 and the subsequent activation of mass actuator 80, the activation delay may be taken into consideration by implementing a delay between the activation of trigger 56 and action 54 igniting the primer of ammunition round 18 and thereby setting off the propellant in the round. In this aspect, the firearm can be configured to igniting the ammunition after trigger 56 is depressed by a delay interval that is selected to substantially correspond to an actuation delay of the recoil-reducing apparatus 66.

Alternatively, or in addition, firearm 50 may be configured to be capable of repeated fire, such as where the firearm is an automatic firearm. Processor 88 can be configured to detect that firearm 50 is firing repeatedly, calculate the average time interval between consecutive shots, and thereby synchronize the repeated activation of recoil-reducing apparatus 66 with the rate of fire in order to more effectively compensate for the resulting recoil forces on the automatic firearm. The resulting recoil compensation may be more effective when the firing rate of firearm 50 remains substantially constant.

In an alternative configuration for a recoil-compensating firearm, the firearm includes a barrel having a longitudinal barrel axis and an action that is configured to load and fire a round of ammunition to impel a projectile down the barrel. The firearm of this alternative configuration further includes a magnetic body rigidly coupled to a first portion of the firearm, and a mass actuator rigidly coupled to a second portion of the firearm, where the first portion and the second portion of the firearm are coupled to one another by a flexible and resilient mass support.

In this configuration the mass actuator is configured to act upon the magnetic body so as to urge the first and second portions of the firearm away from one another, such that the first and second portions move apart along a translation axis that is substantially parallel to the barrel axis. By doing so, the portion of the firearm incorporating the barrel and action is thereby moved in a distal direction and can at least partially dissipate a recoil imparted to the firearm by impelling the projectile down the barrel.

Figure 8:
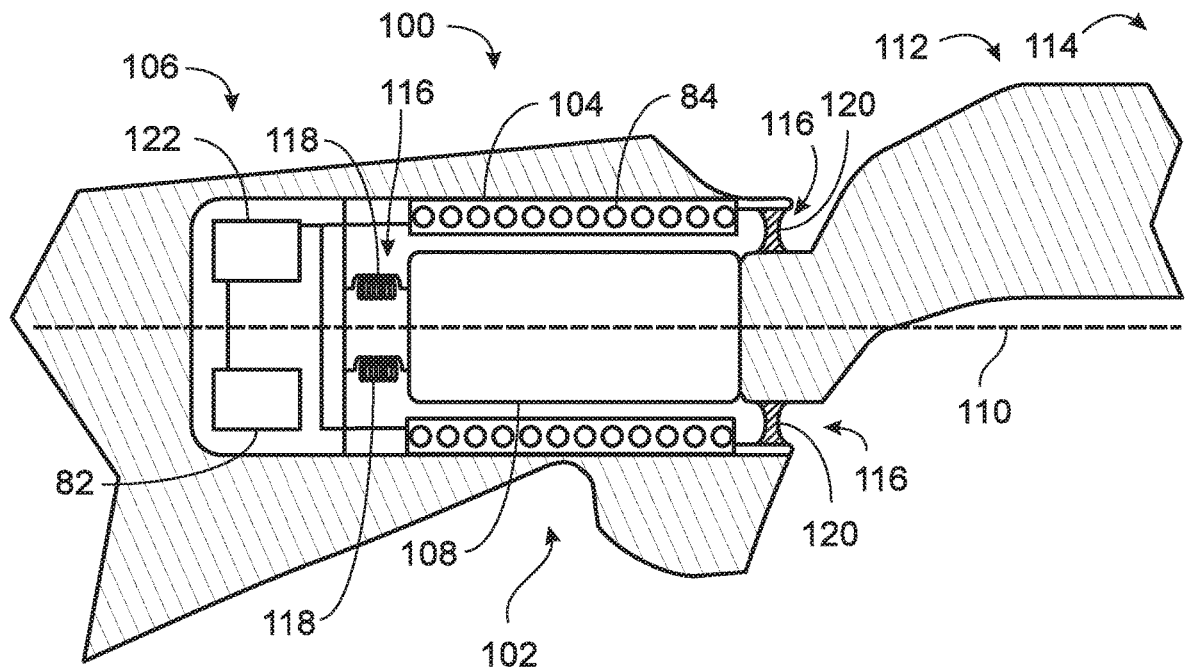
FIG. 8 semi-schematically depicts an alternative recoil-reducing apparatus according to an illustrative aspect of the present disclosure.

As an illustrative example of this alternative configuration, a recoil-compensating firearm 100 is depicted in FIG. 8. Firearm 100 is similar to firearm 50 of FIGS. 4-5, excepting that instead of employing a mass actuator configured to translate an inertial mass along a translation axis parallel to the applied recoil vector, recoil-reducing apparatus 102 employs a mass actuator 104 that essentially acts upon the mass of firearm 100 itself via a magnetic interaction with the mass actuator.

As shown, recoil-reducing apparatus 102 includes a mass actuator 104 configured to act upon a magnetic body 108 along a translation axis 110. However, while mass actuator 104 is coupled to the grip or stock 106 of firearm 100, corresponding magnetic body 108 can be rigidly coupled to action 112 and barrel 114 of firearm 100. The resulting combination of magnetic body 108 with the combined action and barrel is itself flexibly coupled to grip or stock 106 by a mass support 116. Mass support 116 can include, for example, spring elements 118 and flexible couplings 120, such that upon activation of mass actuator 104 the differential force exerted between grip or stock 106 and magnetic body 108 by the mass actuator results in an effective translation of magnetic body 108, action 112, and barrel 114 as a unit to oppose an applied recoil force. Sensors configured for transmission to firing detector 122 are not shown in FIG. 8 for the sake of the clarity of the drawing.

As an alternative configuration for firearm 100, the relative positions of mass actuator 104 and magnetic body 108 could be reversed. That is, magnetic body 108 can be coupled to grip or stock 106, while mass actuator 104 can be coupled to action 112 and barrel 114.

Figure 9:
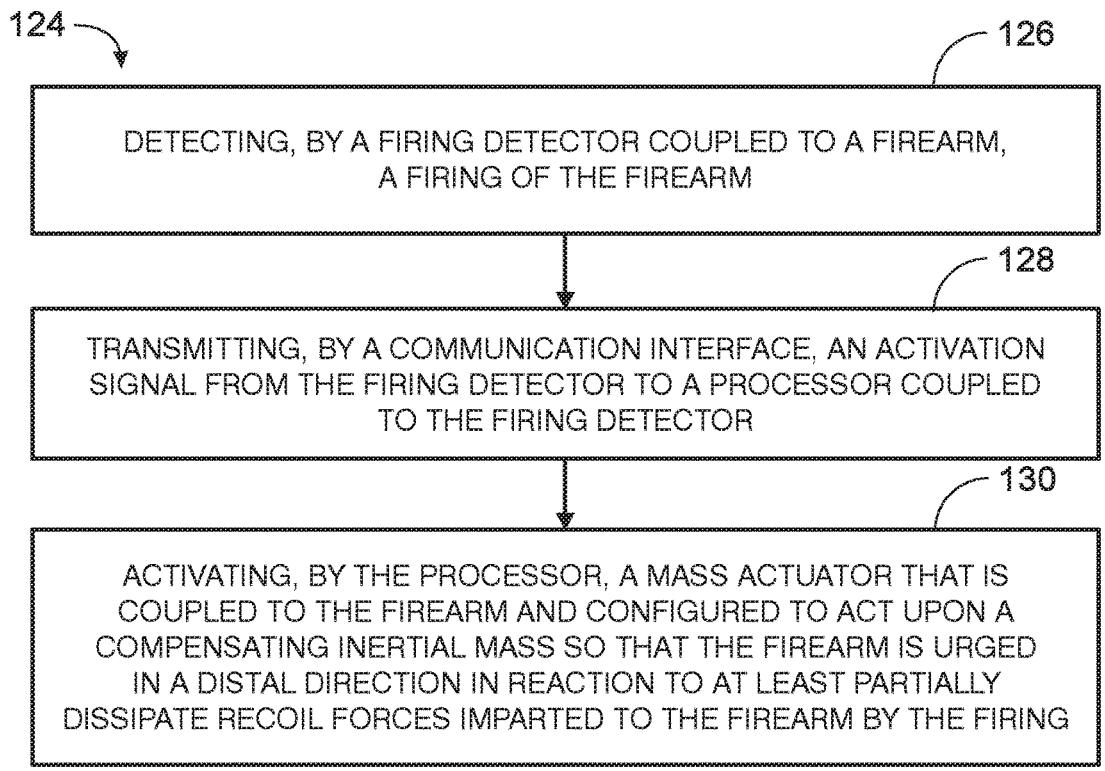
FIG. 9 provides a flowchart depicting an illustrative method of reducing firearm recoil forces.

The recoil-reducing firearms disclosed herein have particular utility for a method of reducing firearm recoil forces on firearm users, as set out in flowchart 124 of FIG. 9; detecting, by a firing detector coupled to a firearm, a firing of the firearm, at step 126 of flowchart 124. The method further includes transmitting, by a communication interface, an activation signal from the firing detector to a processor coupled to the firing detector, at step 128 of flowchart 124, and activating, by the processor, a mass actuator that is coupled to the firearm and configured to act upon a compensating inertial mass so that the firearm is urged in a distal direction in reaction to at least partially dissipate recoil forces imparted to the firearm by the firing, at step 130 of flowchart 124.

By the term "substantially" or "approximately," with reference to characteristics, parameters, amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Examples, Components, and Alternatives

The following numbered paragraphs describe selected aspects of the disclosed recoil-reducing firearms and methods of reducing firearm recoil forces using the recoil-reducing firearms. The examples in these sections are intended for illustration and should not be interpreted as limiting the entire scope of the present disclosure. Each section may include one or more distinct embodiments or examples, and/or contextual or related information, function, and/or structure.

A1. A recoil-reducing firearm, comprising: a barrel, having a longitudinal barrel axis; an action, including a trigger, configured to load and fire a round of ammunition to impel a projectile down the barrel; and a compensating inertial mass coupled to the firearm by a flexible and resilient mass support, wherein the mass support permits translation of the compensating inertial mass along a translation axis but substantially prevents movement of the compensating inertial mass in a direction orthogonal to the translation axis; wherein a movement of the compensating inertial mass in a distal direction at least partially dissipates energy imparted to the firearm by firing a round of ammunition and impelling the projectile down the barrel.

A2. The firearm of paragraph A1, wherein the translation axis is approximately parallel to the barrel axis.

A3. The firearm of paragraph A1, wherein the mass support includes one or more springs that provide a resistance to translation of the compensating inertial mass along the translation axis.

A4. The firearm of paragraph A1, further comprising a stock or grip coupled to the action and barrel of the firearm, wherein the compensating inertial mass and resilient mass support are coupled to the stock or grip.

B1. A recoil-reducing firearm, comprising: a barrel, having a longitudinal barrel axis; an action, including a trigger, configured to load and fire a round of ammunition to impel a projectile down the barrel; a compensating inertial mass coupled to the firearm by a flexible and resilient mass support, wherein the mass support permits translation of the compensating inertial mass along a translation axis but prevents movement of the compensating inertial mass in a direction orthogonal to the translation axis; a mass actuator coupled to the firearm and configured to act upon the compensating inertial mass so as to urge the firearm in a distal direction upon activation of the mass actuator; and a firing detector configured to transmit an activation signal to a processor coupled to the firing detector upon detecting a firing of the firearm; wherein the processor is configured to activate the mass actuator upon receiving the activation signal from the firing detector, and movement of the firearm in the distal direction upon activation of the mass actuator is capable of at least partially dissipating a recoil imparted to the firearm by impelling a projectile down the barrel.

B2. The firearm of paragraph B1, wherein the translation axis is approximately parallel to the barrel axis.

B3. The firearm of paragraph B1, wherein the activation signal is transmitted from the firing detector to the processor via a communication link.

B4. The firearm of claim B1, further comprising a stock or grip coupled to the action and barrel of the firearm, wherein the compensating inertial mass, resilient mass support, and mass actuator are coupled to the stock or grip.

B5. The firearm of paragraph B1, wherein the compensating inertial mass is ferromagnetic, the mass actuator includes an electromagnetic coil surrounding the ferromagnetic compensating inertial mass, and the compensating inertial mass is acted upon by the mass actuator by passing a current through the electromagnetic coil.

B6. The firearm of paragraph B1, wherein the firing detector includes one or more sensors configured to detect the firing of the firearm.

B7. The firearm of paragraph B6, wherein the one or more sensors include an accelerometer configured to detect the firing of the firearm by detecting a movement of the firearm, and activation of the mass actuator is triggered by a detection of the recoil imparted to the firearm.

B8. The firearm of paragraph B6, wherein the one or more sensors include an action sensor configured to detect the firing of the firearm by detecting a movement of one or more components of the action.

B9. The firearm of paragraph B8, wherein the action sensor includes a trigger sensor.

B10. The firearm of paragraph B8, wherein the action sensor is configured to transmit an activation signal to the processor, and the processor is configured to activate the mass actuator at a time selected so as to substantially coincide with the recoil imparted to the firearm by impelling the projectile down the barrel.

C1. A recoil-reducing firearm, comprising a barrel, having a longitudinal barrel axis; an action that is configured to load and fire a round of ammunition to impel a projectile down the barrel; a magnetic body rigidly coupled to a first portion of the firearm; a mass actuator rigidly coupled to a second portion of the firearm; wherein the first portion and the second portion of the firearm are coupled to one another by a flexible and resilient mass support; and the mass actuator is configured to act upon the magnetic body so as to urge the first and second portions of the firearm apart along a translation axis that is substantially parallel to the barrel axis, thereby at least partially dissipating a recoil imparted to the firearm by impelling the projectile down the barrel.

D1. A method of reducing firearm recoil forces on a firearm user, comprising: detecting, by a firing detector coupled to a firearm, a firing of the firearm; transmitting, by a communication interface, an activation signal from the firing detector to a processor coupled to the firing detector; and activating, by the processor, a mass actuator that is coupled to the firearm and configured to act upon a compensating inertial mass so that the firearm is urged in a distal direction in reaction to at least partially dissipate recoil forces imparted to the firearm by the firing.

D2. The method of paragraph D1, wherein activating the mass actuator includes acting upon a compensating inertial mass that is coupled to the firearm by a flexible and resilient mass support that permits translation of the compensating inertial mass along a translation axis but substantially prevents movement of the compensating inertial mass in a direction orthogonal to the translation axis.

D3. The method of paragraph D1, wherein detecting the firing of the firearm by the firing detector includes detecting the firing of the firearm by one or more sensors of the firing detector.

D4. The method of paragraph D3, wherein detecting the firing of the firearm by the one or more sensors of the firing detector includes detecting a movement of the firearm by a sensor that includes an accelerometer.

D5. The method of paragraph D3, wherein detecting the firing of the firearm includes detecting a movement of one or more components of an action of the firearm.

D6. The method of paragraph D5, wherein activating the mass actuator includes timing an activation of the mass actuator to substantially coincide with the firing of the firearm.

Advantages, Features, Benefits

The different embodiments and examples of the recoil-reducing firearms and their methods of use described herein provide several advantages over earlier recoil compensating techniques.

In particular, the passive and/or active compensation of recoil forces as disclosed herein can help prevent or improve a number of injuries due to, or exacerbated by, firearm use. The prevention of injuries includes preventing or ameliorating injuries that may occur during even a single firing, such as bruising, lacerations, and even fractures. More importantly, the compensation of recoil forces can significantly impact those injuries due to repetitive exposure to recoil forces, such as soft tissue injuries, persistent pain and inflammation, and even joint injury.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A recoil-reducing firearm, comprising:
a barrel, having a longitudinal barrel axis;
an action, including a trigger, configured to load and fire a round of ammunition to impel a projectile down the barrel;
a compensating inertial mass coupled to the firearm by a flexible and resilient mass support, wherein the mass support permits translation of the compensating inertial mass along a translation axis but substantially prevents movement of the compensating inertial mass in a direction orthogonal to the translation axis; and
a mass actuator coupled to the firearm and configured to act upon the compensating inertial mass so as to urge the firearm in a distal direction upon activation of the mass actuator;
wherein a movement of the compensating inertial mass in a proximal direction at least partially dissipates energy imparted to the firearm by firing the round of ammunition and impelling the projectile down the barrel.

2. The firearm of claim 1, wherein the translation axis is approximately parallel to the barrel axis.

3. The firearm of claim 1, wherein the mass support includes one or more springs that provide a resistance to translation of the compensating inertial mass along the translation axis.

4. The firearm of claim 1, further comprising a stock or grip coupled to the action and barrel of the firearm, wherein the compensating inertial mass and the resilient mass support are coupled to the stock or grip.

5. A recoil-reducing firearm, comprising:
a barrel, having a longitudinal barrel axis;
an action, including a trigger, configured to load and fire a round of ammunition to impel a projectile down the barrel;
a compensating inertial mass coupled to the firearm by a flexible and resilient mass support, wherein the mass support permits translation of the compensating inertial mass along a translation axis but prevents movement of the compensating inertial mass in a direction orthogonal to the translation axis;
a mass actuator coupled to the firearm and configured to act upon the compensating inertial mass so as to urge the firearm in a distal direction upon activation of the mass actuator; and
a firing detector configured to transmit an activation signal to a processor coupled to the firing detector upon detecting a firing of the firearm;
wherein the processor is configured to activate the mass actuator upon receiving the activation signal from the firing detector, and movement of the firearm in the distal direction upon activation of the mass actuator is capable of at least partially dissipating a recoil imparted to the firearm by impelling the projectile down the barrel.

6. The firearm of claim 5, wherein the translation axis is approximately parallel to the barrel axis.

7. The firearm of claim 5, wherein the activation signal is transmitted from the firing detector to the processor via a communication link.

8. The firearm of claim 5, further comprising a stock or grip coupled to the action and the barrel of the firearm, wherein the compensating inertial mass, the resilient mass support, and the mass actuator are coupled to the stock or grip.

9. The firearm of claim 5, wherein the compensating inertial mass is ferromagnetic, the mass actuator includes an electromagnetic coil surrounding the compensating inertial mass, and the compensating inertial mass is acted upon by the mass actuator by passing a current through the electromagnetic coil.

10. The firearm of claim 5, wherein the firing detector includes one or more sensors configured to detect the firing of the firearm.

11. The firearm of claim 10, wherein the one or more sensors include an accelerometer configured to detect the firing of the firearm by detecting a movement of the firearm, and activation of the mass actuator is triggered by a detection of the recoil imparted to the firearm.

12. The firearm of claim 10, wherein the one or more sensors include an action sensor configured to detect the firing of the firearm by detecting a movement of one or more components of the action.

13. The firearm of claim 12, wherein the action sensor includes a trigger sensor.

14. The firearm of claim 12, wherein the action sensor is configured to transmit an activation signal to the processor, and the processor is configured to activate the mass actuator at a time selected so as to substantially coincide with the recoil imparted to the firearm by impelling the projectile down the barrel.

15. A recoil-reducing firearm, comprising:
a barrel, having a longitudinal barrel axis;
an action that is configured to load and fire a round of ammunition to impel a projectile down the barrel;
a magnetic body rigidly coupled to a first portion of the firearm;
a mass actuator rigidly coupled to a second portion of the firearm;
wherein the first portion and the second portion of the firearm are coupled to one another by a flexible and resilient mass support; and the mass actuator is configured to act upon the magnetic body so as to urge the first and second portions of the firearm apart along a translation axis that is substantially parallel to the barrel axis, thereby at least partially dissipating a recoil imparted to the firearm by impelling the projectile down the barrel.

16. A method of reducing firearm recoil forces on a firearm user, comprising:

detecting, by a firing detector coupled to a firearm including a barrel having a longitudinal barrel axis, a firing of the firearm;

configuring, an action, including a trigger, to load and fire a round of ammunition to fire a projectile down the barrel;

transmitting, by a communication interface, an activation signal from the firing detector to a processor coupled to the firing detector; and activating, by the processor, a mass actuator that is coupled to the firearm and configured to act upon a compensating inertial mass upon receiving the activation signal from the firing detector, so that the firearm is urged in a distal direction upon activation of the mass actuator, in reaction to at least partially dissipate recoil forces imparted to the firearm by the firing of the projectile down the barrel;

wherein activating the mass actuator includes acting upon the compensating inertial mass that is coupled to the firearm by a flexible and resilient mass support that permits translation of the compensating inertial mass along a translation axis but prevents movement of the compensating inertial mass in a direction orthogonal to the translation axis.

17. The method of claim 16, wherein the translation axis is approximately parallel to the barrel axis.

18. The method of claim 16, wherein detecting the firing of the firearm by the firing detector includes detecting the firing of the firearm by one or more sensors of the firing detector.

19. The method of claim 18, wherein detecting the firing of the firearm by the one or more sensors of the firing detector includes detecting a movement of the firearm by a sensor that includes an accelerometer.

20. The method of claim 18, wherein detecting the firing of the firearm includes detecting a movement of one or more components of the action of the firearm.

21. The method of claim 20, wherein activating the mass actuator includes timing an activation of the mass actuator to substantially coincide with the firing of the firearm.

* * * * *